April 9, 1968     S. J. HARNETT ET AL     3,376,818

ROCKET MOTOR

Filed May 12, 1966

Inventor
STEPHEN J. HARNETT
MYRON A. OLSTEIN

By Harry M. Saragovitz
Edward J. Kelly, Herbert Berl
& S. Dubroff
           Attorneys

United States Patent Office 3,376,818
Patented Apr. 9, 1968

3,376,818
ROCKET MOTOR
Stephen J. Harnett, Mount Arlington, N.J., and Myron A. Olstein, Springfield, Va., assignors to the United States of America as represented by the Secretary of the Army
Filed May 12, 1966, Ser. No. 550,881
2 Claims. (Cl. 102—49.3)

ABSTRACT OF THE DISCLOSURE

A spin stabilized rocket motor has a tubular housing portion containing an end burning solid propellant grain and terminating in a rearwardly directed nozzle. The nozzle has a convergent section terminating in a throat constriction adjacent the solid propellant grain. Exhaust gas angular velocity eliminating means extend laterally across the convergent section in a plurality of transverse directions adjacent the propellant grain.

---

The invention described herein may be manufactured and used by or for the Government for governmental purposes without the payment to us of any royalty thereon.

This invention relates to rocket motors and, more particularly, to a spin stabilized rocket motor having a nozzle through which gases with relative angular velocity exhaust.

Under high spin conditions, gas particles leaving an ignited propellant surface are at varying angular momentum levels that vary from a minimum at the spinning rocket or projectile center to a maximum at the outer periphery. As the gas particle flow adjacent the motor wall reaches the rocket motor nozzle plate, it becomes directed towards the center, resulting in an increase in angular velocity. This results in a circulatory counterflow which erodes the propellant grain center causing large burning areas, high pressures and erratic motor performance or motor failure.

It is an object of the invention to provide a rocket motor in which the relative angular velocity of gas flow is substantially eliminated adjacent the nozzle, such that the circulatory counterflow is minimized or eliminated.

These and other objects, features and advantages will become more apparent from the following description and accompanying drawings in which.

Figure 4:
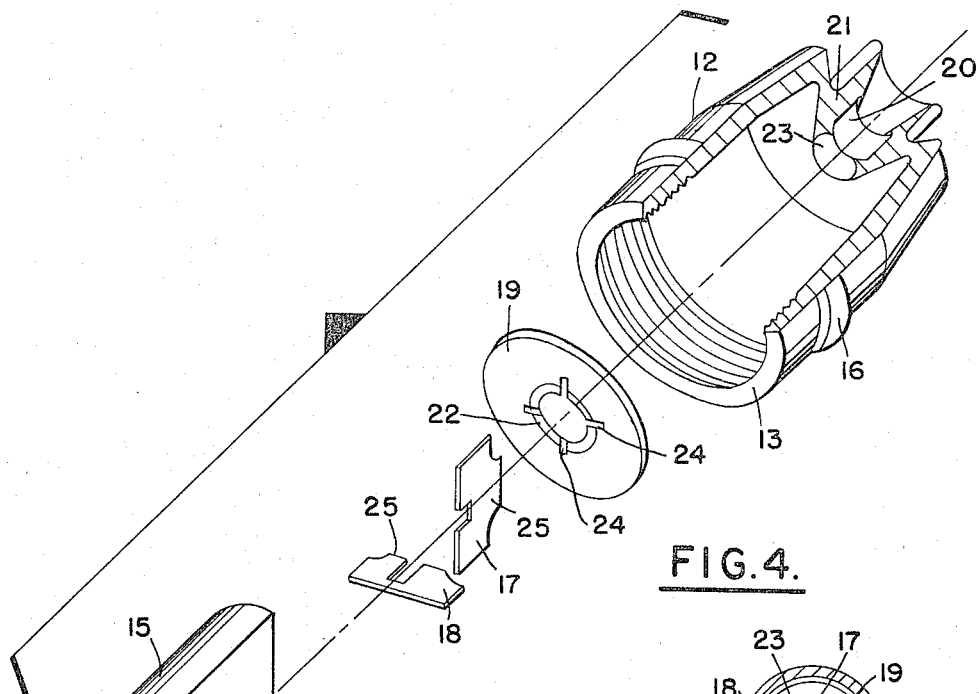
FIG. 4 is an exploded rearward perspective view of certain parts of the FIG. 1 arrangement.
Figure 3:
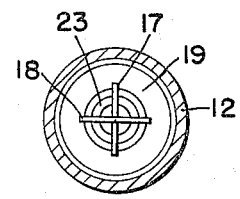
FIG. 3 is a sectional view taken along line 3—3 of FIG. 1.
Figure 1:
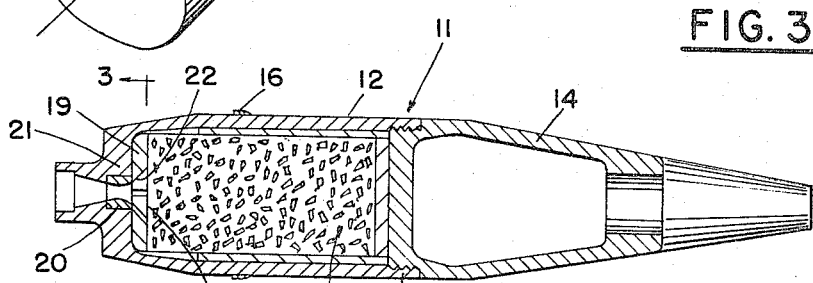
FIG. 1 is a longitudinal sectional view of a rocket motor projectile embodying the principles of the invention.
Figure 2:
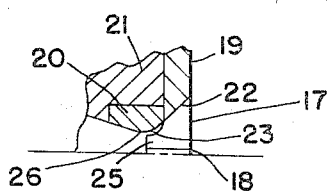
FIG. 2 is an enlarged view of a portion of the FIG. 1 arrangement.

The rocket motor projectile, shown generally at 11 (FIG. 1), includes a rocket motor body 12 (FIGS. 1, 3, 4) having an internally threaded forward portion 13 suitably secured upon assembly to the forward projectile warhead portion 14 with an end burning propellant grain (cigarette type) 15 positioned within the motor body 12. Body 12 has a rifling band or the like 16 on its tubular sidewall external surface for imparting a desired projectile spin from suitably rifled gun tubes and terminates rearwardly with an inwardly directed nozzle construction including integral wall or plate 21 having an appropriate seating arrangement for nozzle throat insert 20 (FIGS. 1, 2, 3, 4) and nozzle plate insulation 19 which has a centrally apertured convergent surface 22 that matingly aligns with the forward converging portion 23 of throat insert 20.

Nozzle plate insulation 19 preferably is provided with a plurality of inwardly opening slots 24 to accommodate the outer extremities of corresponding gas deflector vanes or interlocking bars 17, 18 which extend laterally or transversely across diametrically opposed portions of converging surfaces 22. Preferably, bars 17, 18 are suitably bonded to the nozzle plate insulation 19 and each contain a reduced rearward extension 25 that extends longitudinally substantially into the throat construction 26 (FIG. 2) of insert 20.

The arrangement affords sustainer rocket motor performance at high temperatures and high spin rates which can be effectively predicted and evaluated from static tests, etc., due to the improved, controlled or stabilized gas flow in which the relative angular velocity has been minimized at the motor nozzle throat area.

Various modifications, changes, or alterations may be resorted to without departing from the scope of the invention as defined in the appended claims.

We claim:

1. In a spin stabilized rocket motor having a tubular housing portion containing an end burning solid propellant grain, said housing portion having a rifling band on its sidewall external surface and terminating in a rearwardly directed nozzle construction, said nozzle construction having a convergent section terminating in a throat constriction adjacent said solid propellant grain, and means for eliminating relative angular velocity that are normally present in gases exhausting through said nozzle, said eliminating means extending laterally across said convergent section in a plurality of transverse directions adjacent said propellant grain and extending longitudinally substantially into said throat constriction.

2. The structure of claim 1 wherein said eliminating means includes a gas deflector having a plurality of straight vanes intersecting with each other at the longitudinal central axis of said nozzle construction.

References Cited

UNITED STATES PATENTS

| | | | |
|---|---|---|---|
| 2,489,953 | 11/1949 | Burney | 102—49 |
| 2,503,684 | 4/1950 | Pope | 102—49 |
| 2,762,193 | 11/1956 | Johnson | 60—255 |
| 3,174,283 | 3/1965 | Crocco et al. | 60—258 |
| 3,242,668 | 3/1966 | Ellis | 60—260 |

BENJAMIN A. BORCHELT, *Primary Examiner.*
V. R. PENDEGRASS, *Assistant Examiner.*